United States Patent [19]

Lemont

[11] 3,729,272
[45] Apr. 24, 1973

[54] REVERSE VELOCITY ROTOR AND ROTORCRAFT

[75] Inventor: Harold E. Lemont, Calabasas, Calif.

[73] Assignee: Fairchild Industries, Inc., Germantown, Md.

[22] Filed: Oct. 30, 1970

[21] Appl. No.: 85,717

Related U.S. Application Data

[62] Division of Ser. No. 700,469, Jan. 25, 1968, Pat. No. 3,554,662.

[52] U.S. Cl. ................................................416/114
[51] Int. Cl. ................................................B64c 27/74
[58] Field of Search ...................416/114, 112, 113

[56] References Cited

UNITED STATES PATENTS

| | | | |
|---|---|---|---|
| 2,410,545 | 11/1946 | Main | 416/114 |
| 2,581,773 | 1/1952 | Stalker | 416/114 |
| 3,031,017 | 4/1962 | Arcidiacono | 416/114 |
| 3,065,933 | 11/1962 | Williams | 416/228 X |
| 3,102,597 | 9/1963 | Drees | 416/114 X |
| 3,144,908 | 8/1964 | Pascher | 416/112 |
| 3,308,888 | 3/1967 | Arcidiacono | 416/114 |
| 3,404,737 | 10/1968 | Keder | 416/149 |
| 3,504,989 | 4/1970 | Kisovec | 416/114 |

FOREIGN PATENTS OR APPLICATIONS 606,784   8/1948   Great Britain..................416/114

Primary Examiner—Everette A. Powell, Jr.
Attorney—Michael W. York

[57] ABSTRACT

A rotary wing aircraft and rotor control system for such aircraft, which uses the reverse velocity airflow produced by high airspeeds of the aircraft across the retreating blade to generate positive lift on the retreating blade. Blade pitch control means and method for such aircraft providing a two/revolution, cam or higher order cyclic pitch input to generate more uniform lift in the advancing and retreating blade sectors of rotor motion. A main rotor for such aircraft having a new airfoil shape adapted to more efficiently generate positive lift from the reverse velocity airflow, and also having slotted flaps or other auxiliary lift devices for increasing lift at low aircraft airspeeds. A twistably-mounted tail rotor for such aircraft adapted for counter-torque operation at low aircraft airspeeds and for forward propulsion at high airspeeds.

7 Claims, 14 Drawing Figures

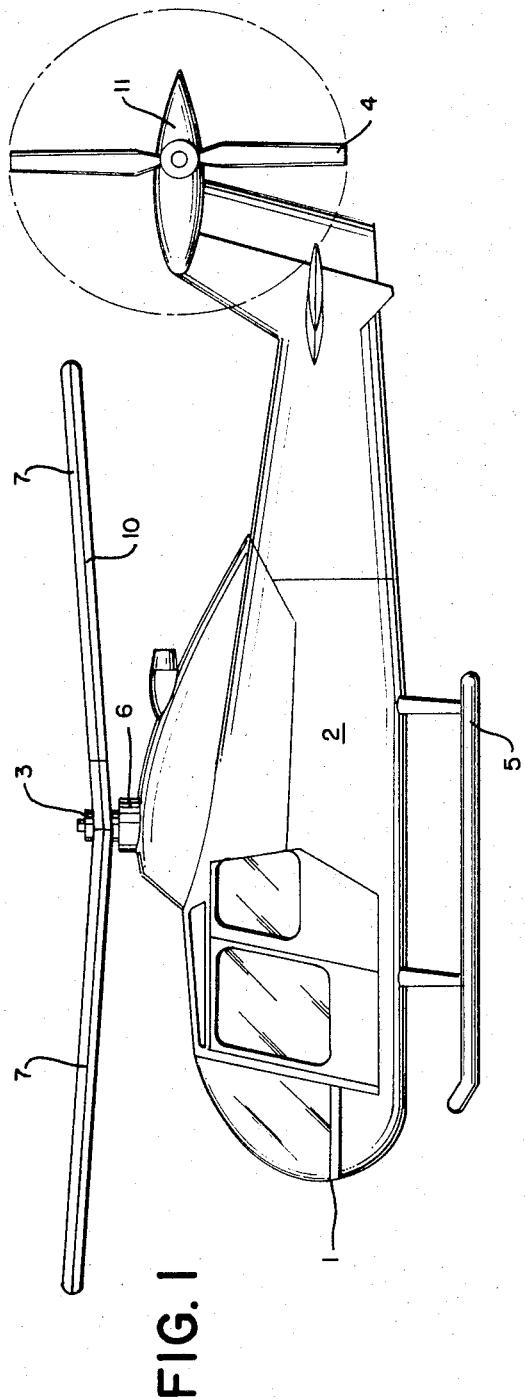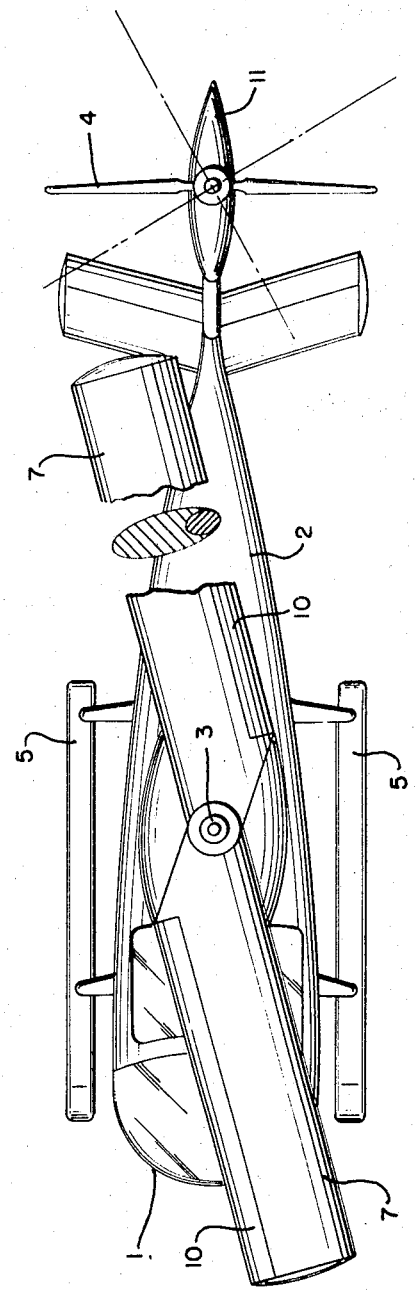

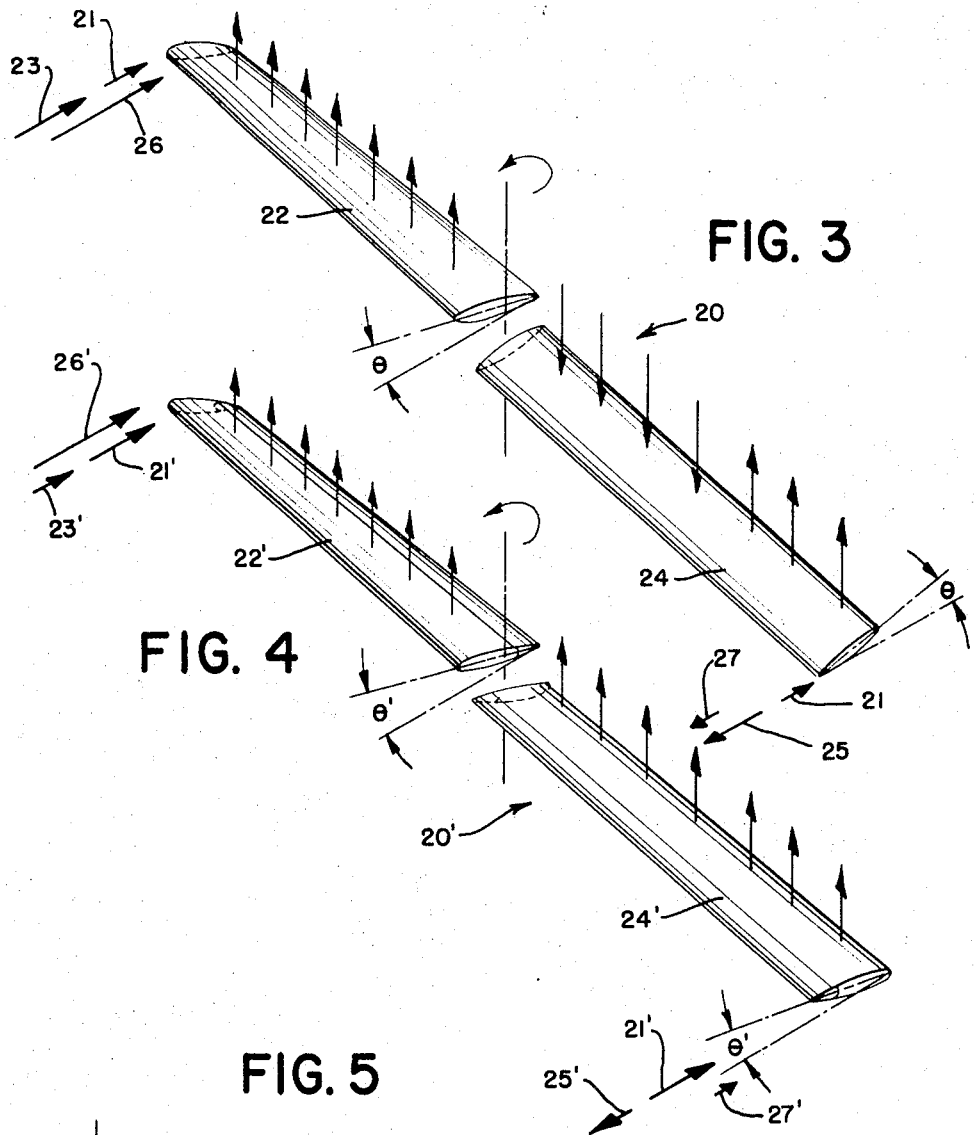
FIG. 3
FIG. 4
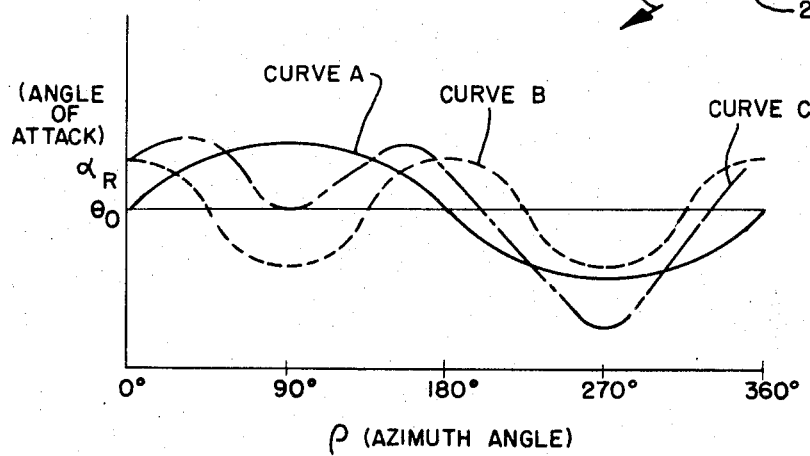
FIG. 5

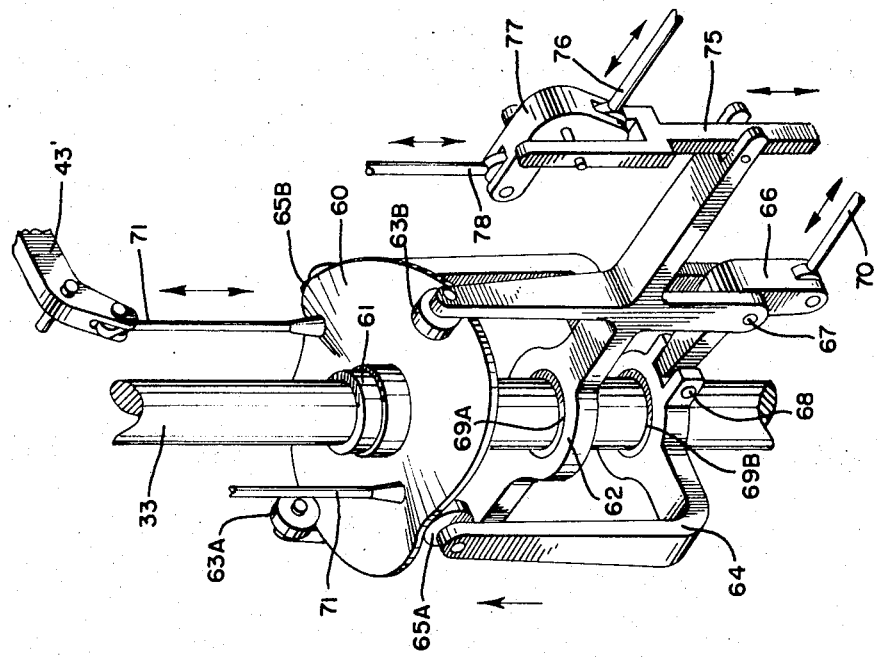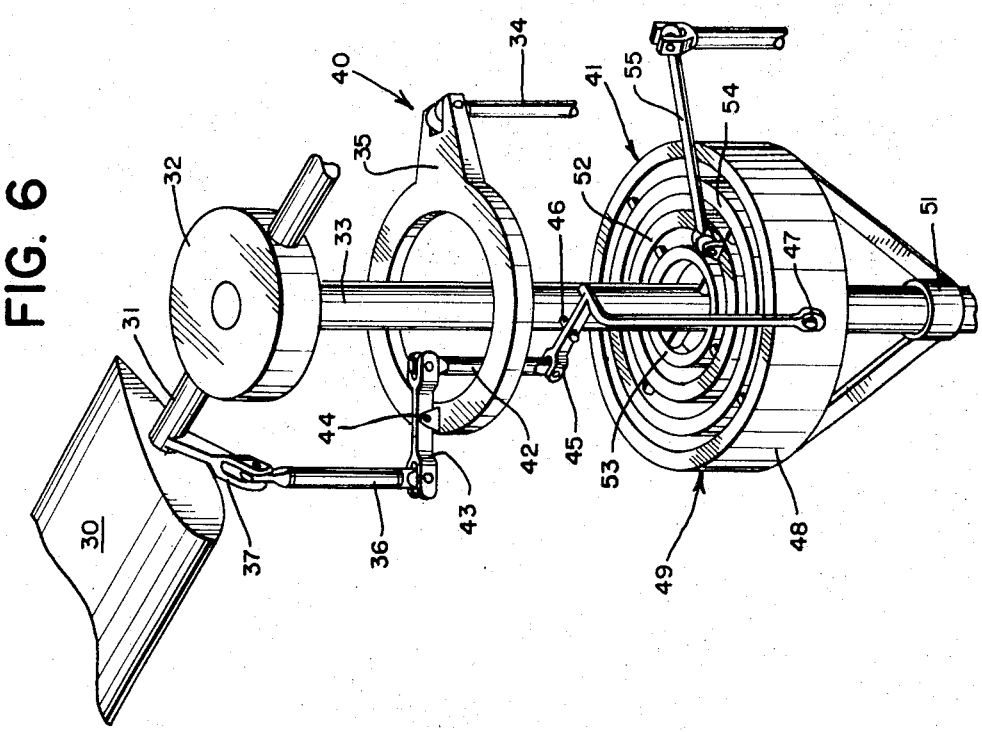

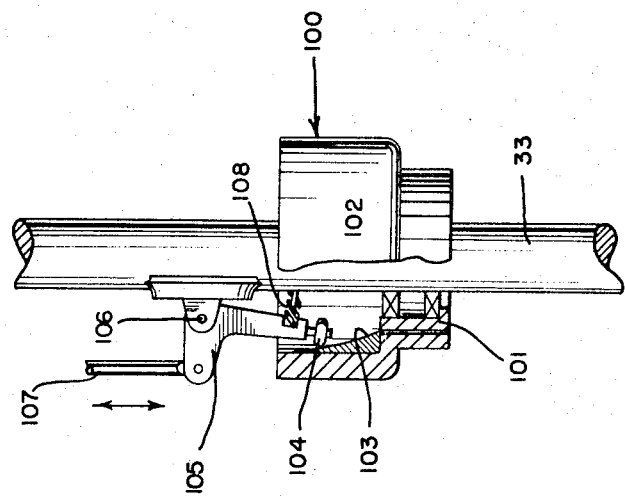
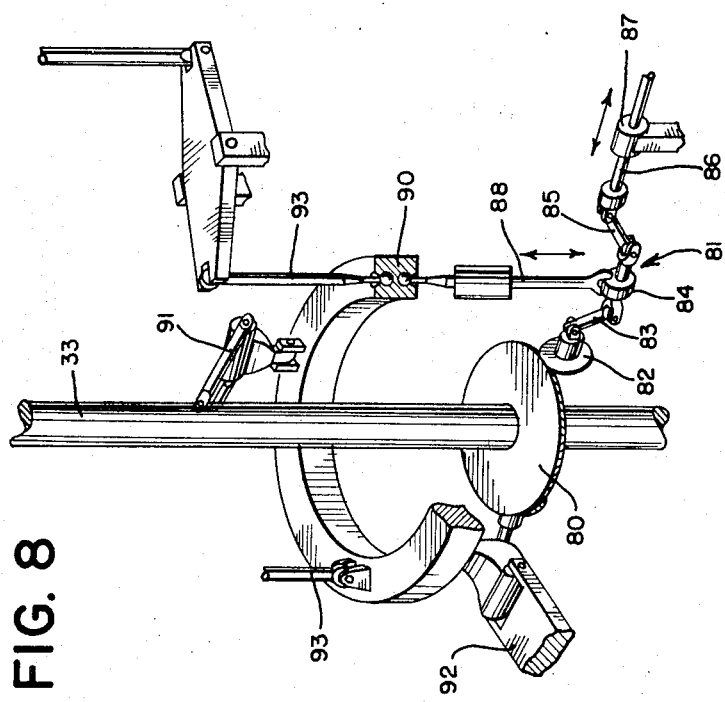

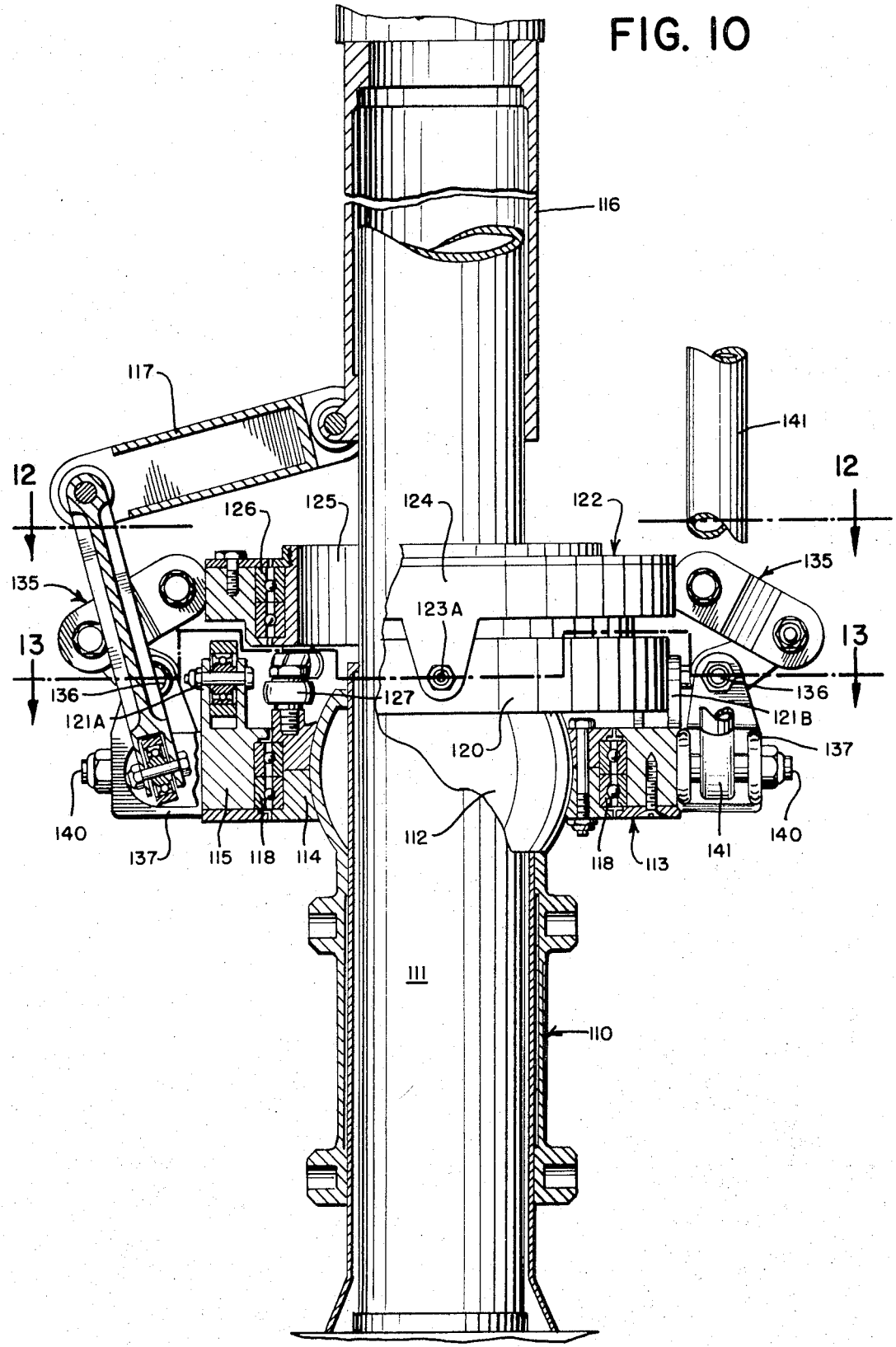

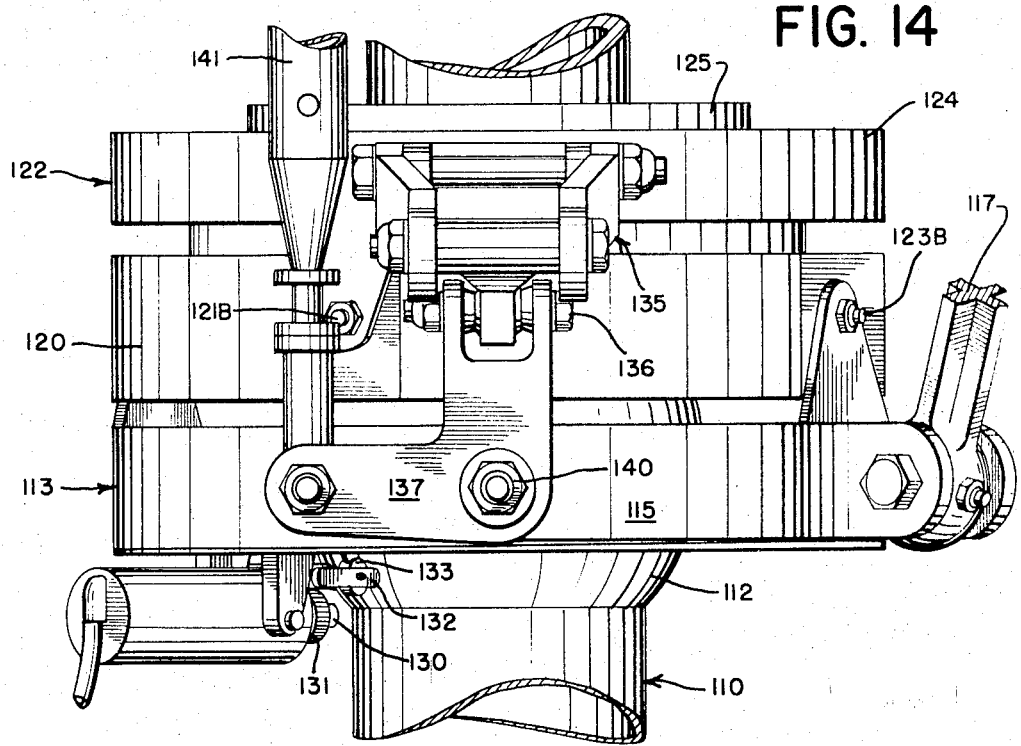
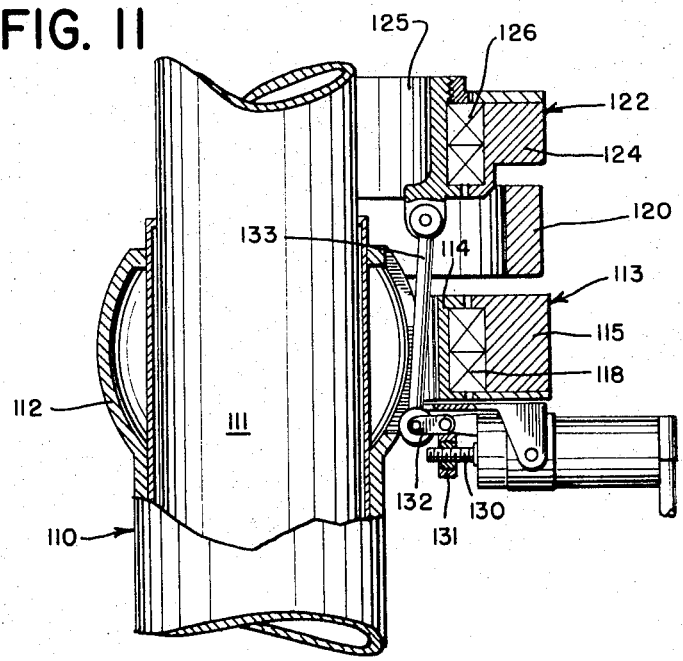

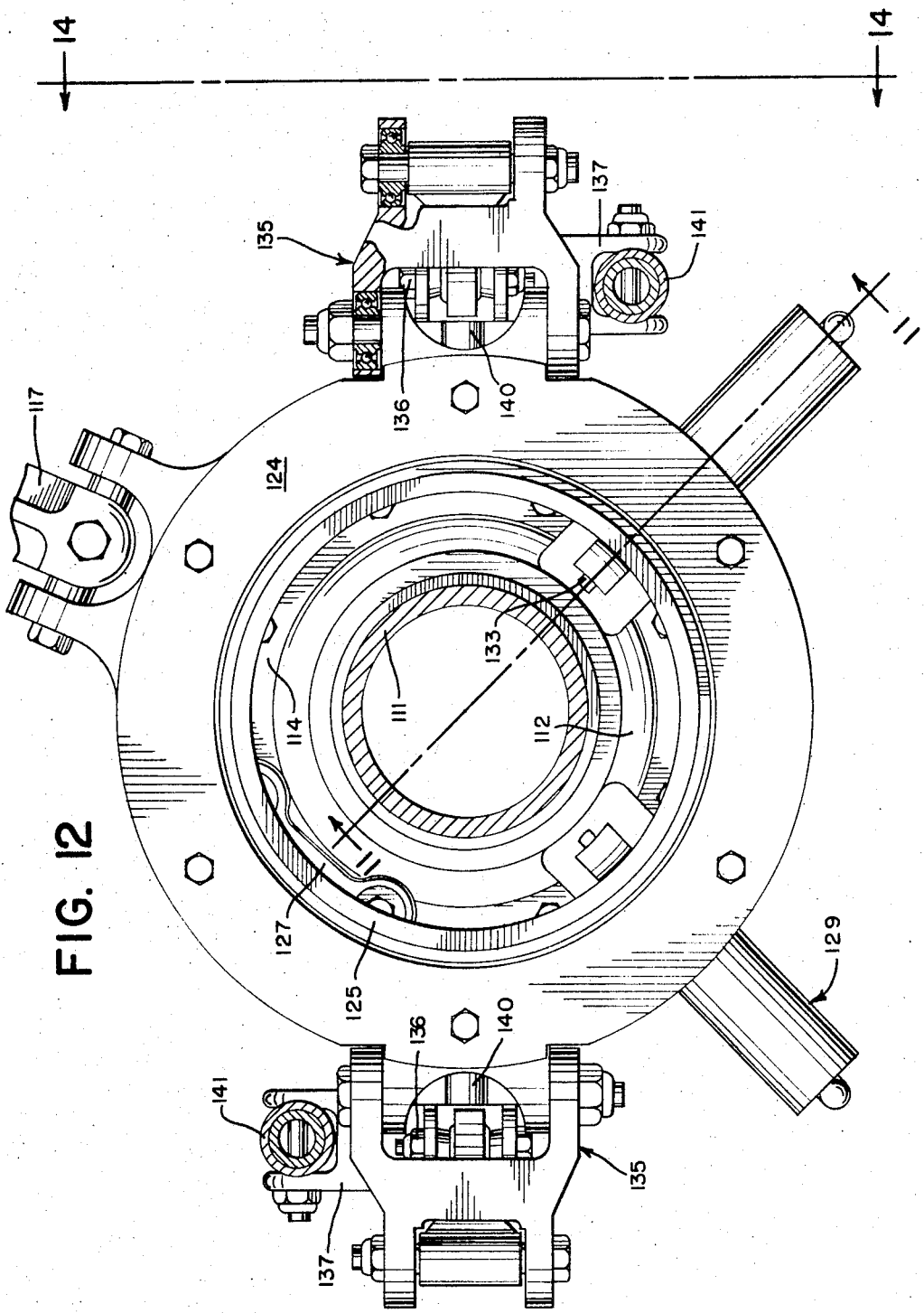

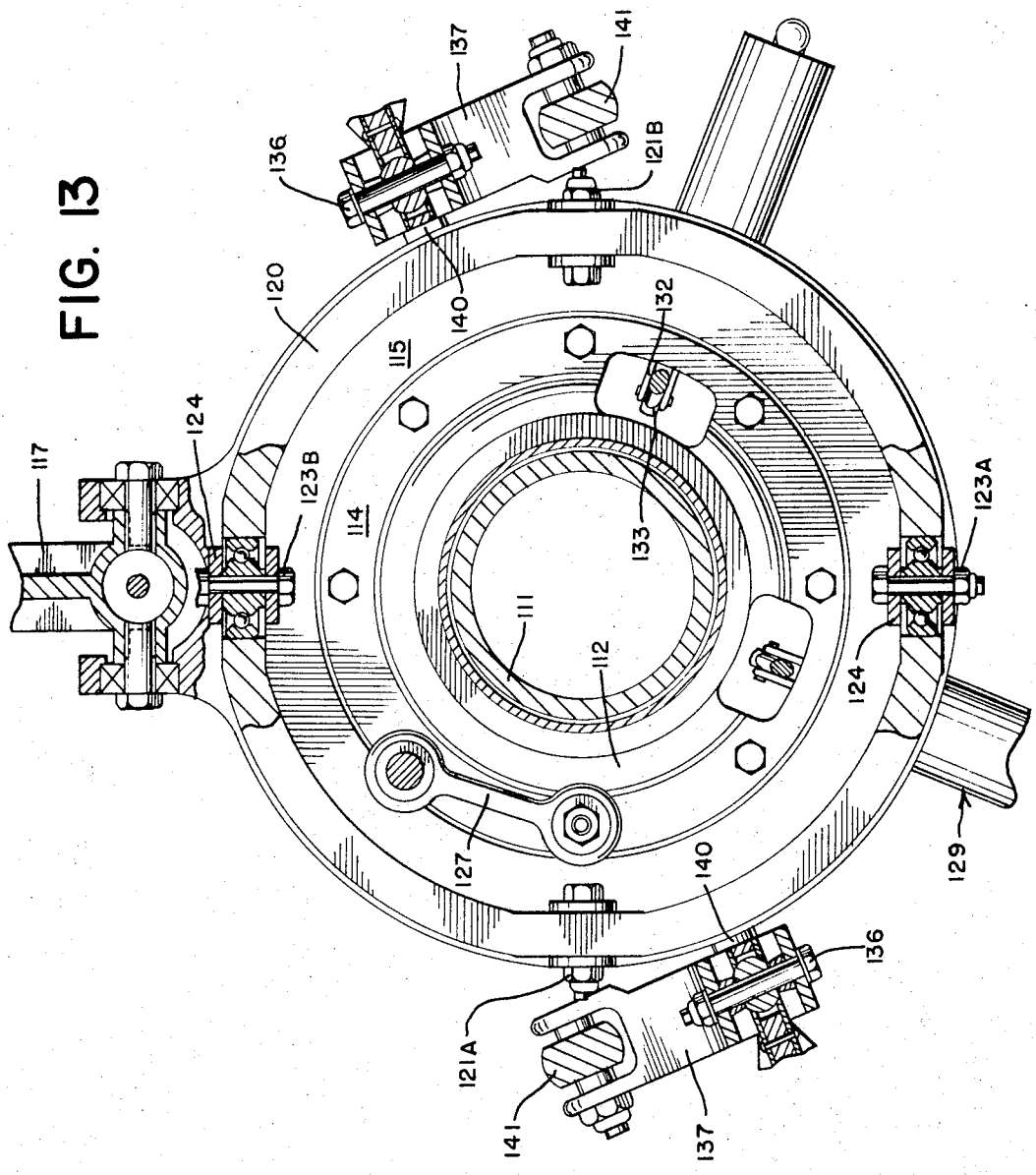

REVERSE VELOCITY ROTOR AND ROTORCRAFT

This application is a division of parent application, Ser. No. 700,469, filed Jan. 25, 1968, now U. S. Pat. No. 3,554,662.

This invention relates to rotary wing aircraft and more specifically to helicopters which employ a new type of main and tail rotor systems which provide improved lifting capacity and higher top speed, climb and range characteristics.

The forward aircraft speed of a conventional helicopter is limited by a number of factors. Among them is the tendency of the retreating blade to stall at high forward airspeeds. As the forward airspeed increases, the air flow over the retreating blade slows down, thus the blade may approach a stall condition. In contrast the airflow velocity across the advancing blade increases with increasing forward speed.

This situation would create an unstable condition if no means were provided to equalize lift across the advancing and retreating blades. Accordingly, blade flapping and feathering means are normally used to equalize the lift. Thus, as the airflow velocity over the retreating blade decreases with increasing forward airspeed, blade flapping and feathering increases the angle of attack of the retreating blade and decreases the angle of attack of the advancing blade so as to tend to equalize lift throughout the rotor disc area. However, as the angle of attack of the retreating blade is increased further, the retreating blade approaches a stall point for a given forward airspeed.

To avoid the retreating blade stall, the rotor can be speeded up. However, when this is done the advancing blade encounters progressively higher velocities, approaching a maximum blade velocity with the accompanying power loss and roughness due to compressibility Mach number effects.

Thus, operation near the stall point on the retreating blade and near the maximum speed on the advancing blade causes the following adverse effects: (1) severe vibrations of the helicopter and controls, (2) large increase in profile-drag power requirements, (3) compressibility Mach number problems on the advancing blade, (4) sharply increased power requirements to increase speed of rotor revolution, (5) imbalance of lift between the retreating and advancing blades that causes serious rotor dynamic problems which adversely affect the blade flapping operation and the sensitivity of the blade control mechanism. In general, the control, stability and performance of the entire aircraft becomes impaired as the helicopter approaches its maximum forward airspeed.

It is a principal object of this invention to provide a helicopter and helicopter rotor system which substantially increases the maximum speed of helicopters, while materially reducing the above-described adverse effects normally encountered by conventional helicopters.

This is accomplished by varying blade pitch throughout the revolution of the rotor blade so as to generate uniform positive lift in both the advancing and retreating sector of blade travel. The reverse airflow produced across the retreating blade by the high forward speeds of the aircraft is used to generate positive lift in the retreating blade sector of rotor operation. This reverse velocity effect may be increased either by increasing the airspeed of the aircraft or by lowering the rotational speed of the rotor. Also the use of reverse airflow lift in this manner permits the use of shorter, higher solidity ratio rotors.

The reduction of rotor rpm, and rotor length also reduces the effect of compressibility Mach number problems encountered by the advancing blade. As a result, lower vibration and noise levels are encountered. Furthermore, rotor and blade dynamic problems are lessened because of the greatly reduced flapping motion and absence of blade stalling. Since blade flapping aerodynamic damping does not decay with increased flight speeds, as with conventional rotor operation, longitudinal blade sensitivity problems are avoided. Thus, the limitations of conventional helicopters and helicopter rotor systems referred to above are avoided by the invention disclosed herein.

In addition, the invention markedly improves the rotor L/D (lift/drag) ratio. As a result the range, load capacity and airspeed of the helicopter can be substantially increased.

The pitch of the rotor blade is controlled in accordance with the invention by a two/rev., cam, or higher order pitch control input rather than by the conventional one/rev. input. By so doing, the sinusoidal peaks of the angle of attack variation between the advancing and retreating blades which occur with the one/rev. input are substantially reduced. Thus, cyclic pitch inputs of a properly phased one/rev. and two/rev., of a cam, or higher order are combined so as to provide the optimum blade pitch and blade angle of attack through the advancing and retreating blade sectors of rotor travel.

In addition, a short blade radius, high disc loading and high solidity ratio rotor having an airfoil shape which is adapted for reverse velocity lift is disclosed. This rotor is designed primarily for achieving optimum lift at low rpm. at relatively high forward airspeeds. At hovering speeds additional lift devices such as slotted flaps or boundary layer control mechanisms may be provided to produce the additional lift required for the hovering operation. These auxiliary lift mechanisms are phased out of operation as increased airspeed permits.

Another feature of this invention is the use of an auxiliary twistable tail rotor which may be twisted from its transverse counter-torque position as airspeed increases to a fore-and-aft orientation so as to provide additional forward propulsion power and thereby improved lift generation by forward airspeed. The helicopter is thus able to operate like a gyrodyne after a certain airspeed is reached.

These and other objects and advantages of the present invention will be apparent from the following description, reference being had to the accompanying drawings wherein preferred embodiments of the present invention are clearly shown.

In the drawings:

FIGS. 1 and 2 are side and plan views respectively of a helicopter embodying my invention;

FIGS. 3 and 4 are schematic diagrams illustrating certain aerodynamic differences between conventional rotor systems (FIG. 3) and rotor systems embodying this invention (FIG. 4);

FIG. 5 is a graph of a family of curves which qualitatively represents the angle of attack of a rotor embodying this invention;

FIGS. 6, 7, 8 and 9 are schematic illustrations of alternative forms of rotor control systems which are suitable for use in accordance with this invention;

FIGS. 10, 11, 12, 13, 14 are front (FIG. 10), side (FIGS. 11, 14) and cross-sectional (FIGS. 12-13) views respectively of a rotor control system made in accordance with the invention which is suitable for use in the aircraft illustrated in FIGS. 1 and 2.

Referring to FIGS. 1 and 2, as noted previously this invention has particular utility when employed with a rotary wing aircraft such as a helicopter, which is generally designated 1. Such a helicopter includes a fuselage 2, a main rotor 3, counter-torque rotor 4 and landing gear 5.

Main rotor 3 rotates about rotor mounting 6 and consists of two rotor blades 7 which extend outwardly from rotor mounting 6. It will be apparent that rotor blades 7 in the embodiment illustrated in FIGS. 1 and 2 are unusually short and have a high solidity ratio. The reasons for this are briefly referred to above and will be discussed in more detail below. Main rotor 3 may be driven by any conventional rotor drive means.

Each main rotor blade 7 is provided with auxiliary lifting devices such as slotted flaps 10. The purpose of these auxiliary lifting devices is to provide additional positive lift in the hovering and low translational airspeed stages of flight. Other auxiliary lifting devices such as boundary layer control mechanisms or air slots, as well as combinations of these various auxiliary lift means could be used in place of or in conjunction with the flaps 10 in FIG. 1.

It should also be noted that blades 7 of main rotor 3 may be symmetrical in cross section about a horizontal and vertical axis in order to improve lift performance for the reverse velocity positive lift generation.

Counter-torque tail rotor 4 rotates on mounting 11 and may be driven through linkages by the same drive means which powers main rotor 3. Rotor mounting 11 is twistably mounted to fuselage 2 so as to permit repositioning the axis of rotation of the tail rotor 4 from its normally transverse counter-torque orientation to a fore and aft forward propulsion position.

Referring now to FIGS. 3 and 4 for the purpose of explaining the theory of positive lift generation by the reverse velocity rotor principle. FIG. 3 schematically illustrates a conventional helicopter rotor generally designated 20. Rotor 20 turns counterclockwise (as indicated by the curved arrow) to generate lift and thrust. In forward flight the thrust moves rotor 20 (and the helicopter) at some given forward speed represented by vector 21. At the same time rotor 20 moves with a given rotational velocity, represented on the advancing blade 22 as vector 23, and represented on the retreating blade 24 as vector 25.

The resultant relative wind which acts on advancing blade 22 may be represented by vector 26 which is the sum of the vectors 21 and 23. Similarly the relative wind acting on retreating blade 24 may be represented by vector 27 which is the vectorial sum of vectors 21 and 25. It can be seen that the relative wind (vector 26) acting on the advancing blade is from the leading edge toward the trailing edge. The relative wind (vector 27) acting on the retreating blade is also from the leading edge to the trailing edge; however, vector 27 represents a substantially reduced velocity from the advancing blade velocity (vector 26). This results from the fact that the forward airspeed is subtracted from the rotational speed in determining the relative wind on the retreating blade. For a given forward airspeed and a given rotor rpm, the direction of relative wind acting on the retreating blade shifts at a given point on the blade to pass from the trailing edge to the leading edge of the retreating blade. This is a function of rotational speed ($\Omega R$) versus forward airspeed V.

The blade pitch angle $\Theta$ of blades 22 and 24 remains substantially constant in forward flights (disregarding blade twist and coning). The increased lift imposed on the advancing blade 22 causes it to flap upwardly, thus decreasing the angle of attack $\alpha$. Conversely the retreating blade 24 flaps downwardly, thus increasing its angle of attack, thereby tending to equalize lift over the advancing and retreating blade sectors of rotor operation.

However, as the forward airspeed V is increased beyond a given point for a given rotor rpm. the flapping action is inadequate to maintain substantial equality of lift over the two halves of the rotor disc. This is the condition shown in FIG. 3. In this case the reverse airflow across the retreating blade 24 creates negative lift on the inner portion of the blade, and dependent on the rate of forward speed creates either a stalling condition or negative lift near the tip portions of the blade, the negative lift travelling outwardly across the blade as the airspeed V increases.

This unstable condition could be corrected if the rotor rpm. could be increased sufficiently to cause the reversed airflow across the retreating blade 24 to reverse direction again so as to travel from the leading edge to the trailing edge. However, rotor rpm. cannot be increased beyond the point at which the relative wind passing across the advancing blade 22 causes compressibility Mach number problems.

Thus, conventional helicopter rotors must be operated at an airspeed lower than that which causes reverse airflow across a substantial part of the retreating blade and at a lower rpm. than that which causes compressibility Mach number problems on the advancing blade. This has effectively limited forward airspeeds of helicopters to approximately 200 knots in present-day aircraft.

Referring now to FIG. 4 showing a rotor 20' embodying the invention, the same relative wind vectors 21', 23', 25' 26' and 27' are present; however, vector 27' is reversed in direction since rotor rpm has been reduced, meaning that the entire retreating blade 24' is now subjected to reverse airflow. Also, in accordance with this invention, the blade pitch angle $\Theta'$ of the retreating blade 24' is changed in the retreating blade sector of rotor travel so as to generate positive lift by the action of the reverse airflow giving a positive blade angle of attack $\alpha$ (relative to the reverse airflow).

A two/rev. cam, or higher order cyclic pitch input is required in order to control the blade pitch angle $\Theta$ and angle of attack $\alpha$ of the retreating blade in this manner. Details of the method and means for accomplishing this will be described below. Before this, however, the qualitative effect of the two/rev. input as graphically illustrated in FIG. 5 should be understood. The solid line curve A represents the variation of angle of attack applied by the swash plate of a conventional one/rev.

rotor plotted against the azimuth angle of the rotor blade measured from the downwind position in the direction if blade rotation. Dash-line curve B of FIG. 5 represents the two/rev. blade pitch input embodied in this invention (excluding the aforementioned one/rev. input). The solid/dashed line curve C shows the combined one/rev. and two/rev. cyclic pitch input effect accomplished by the invention, thus schematically illustrating the operation of the invention. This effect may be algebraically represented as follows:

$$\alpha r = \Theta_0 - B_1 \sin \rho - A_2 \cos 2\rho - [(\lambda - a_1 \cos \rho + X\mu \sin \rho)/(X + \mu \sin \rho)]$$

where $\alpha_R$ is the angle of attack, $\Theta_0$ is the collective pitch angle, $B$ is the one/rev. feathering coefficient, $\rho$ is azimuth angle, $A_2$ is the two/rev. feathering coefficient, $\lambda$ is the inflow ratio, $X$ is the blade span ratio ($r/R$) and $\mu$ is the tip speed ratio.

It should be understood that the graph of FIG. 5 is schematic and is not intended to present a true representation of a helicopter blade in operation since effects such as blade coning and blade twist and other relevant rotor dynamic effects are not considered. The graph is intended only as an extremely simplified illustration of the general effects and relations of the one/rev. and two/rev. cyclic pitch inputs.

These curves show that the peak positive angle of attack $\alpha$ of the one/rev. input of this system at 90° is modified by the two/rev. input. In the two/rev. system $\alpha$ peaks before and after 90°, an azimuth angle where the relative wind on the advancing blade is less than at the 90° position. Also, it shows a substantially increased negative angle of attack variation at 270°, which is desirable since this produces maximum lift from the reversed velocity airflow across the blade at this azimuth angle.

Referring to FIG. 6, there is schematically illustrated a means for producing a two/rev. cyclic pitch input suitable for controlling a helicopter rotor system in accordance with this invention. Rotor blade 30 is carried by conventional blade support sleeve 31 which extends outwardly from rotor hub 32. Rotor 30 and rotor hub 32 are rotated by rotor shaft 33 by a conventional propulsion means.

The pitch of blade 30 is controlled in part by a conventional pair of one/rev. pitch control links 34 (only one of which is shown) which act through swash plate 35, mixing link 43, pitch link 36 and pitch horn 37 in the usual way to feed the one/rev. cyclic pitch input to the rotor blade 30. Collective pitch is also controlled in a conventional way by raising and lowering swash plate 35 relative to rotor shaft 33.

The devices as thus far described in the two preceding paragraphs relative to FIG. 6 are conventional helicopter blade control elements and operate in a well known way to control the collective and one/rev. cyclic pitch of the rotor blades. Since they are conventional elements and of themselves do not form a part of this invention, they will not be described in further detail. They will be collectively referred to below as a conventional one/rev. cyclic and collective pitch control assembly generally designated 40.

Associated with conventional one/rev. cyclic and collective pitch control unit 40 is a two/rev. pitch control unit generally designated 41. Its function is to provide a two/rev. vertical input to push rod 42 which pivots mixing link 43 relative to swash plate 35 about pivot point 44 on the swash plate. This pivotal movement of mixing link 43 also permits combining the phasing of the vertical two/rev. input of push rod 42 with the one/rev. input link 34 to swash plate 35.

The vertical movement of push rod 42 is produced by bell crank 45 which is pivotally connected at its upper end to the lower end of push rod 42. Bell crank 45 is fulcrummed about pivot point 46 on rotor shaft 33. The input causing bell crank to pivot about pivot point 46 is introduced through a pivotal connection 47 with the secondary cylinder 48 of a Hooke's type universal joint generally designated 49. Cylinder 48 is rotatably and coaxially mounted about rotor shaft 33 by journal bearing means 51 extending downwardly from cylinder 48 and around shaft 33. Bearing means 51 permit cylinder 48 to rotate relative to shaft 33 but limits the axial orientation of cylinder 48 to an axis which is coaxial with that of shaft 33.

A tiltable cylinder 52 which is the primary cylinder member of the Hooke's joint is universally mounted between cylinder 48 and rotor shaft 33 by gimbal ring 53 connecting shaft 33 to cylinder 52 and gimbal ring 54 connecting cylinder 52 to cylinder 48.

Thus, it can be seen that primary cylinder 52 is tiltable relative to the coaxially aligned shaft 33 and cylinder 48, and that cylinder 52 is caused to rotate at the same rpm. as shaft 33 by means of gimbal ring 53. Connected to cylinder 52 is the two/rev. input linkage 55 which is positioned to permit tilting of primary cylinder 52 relative to shaft 33 and secondary cylinder 48.

As is will known, if the axes of the driving and driven shafts of a Hooke's universal joint are tilted relative to each other, the speed of one shaft is caused to oscillate relative to the other at a two/rev. frequency. If the driving shaft is maintained at a uniform speed, the driven shaft (when the axis is misaligned from the axis of the driving shaft) is caused to rotate first faster and then slower than the driving shaft with each revolution of the driving shaft. The variation of the rotational speed in the driven shaft is a function of the angle of misalignment between the two shafts.

Applying this to the two/rev. input assembly 41 which is a form of a Hooke's joint, tilting of primary cylinder 52 relative to secondary cylinder 48 causes the rotational speed of cylinder 48 to oscillate at a slower than faster speed than cylinder 52 for each revolution of cylinder 52. The amount of oscillation is a well-known function of the angular displacement between the axes of the cylinders 48 and 52. This angular displacement is controlled by means of the two/rev. input linkage 55.

The effect of the oscillation of cylinder 48 is to pivot bell crank 45 back and forth with every revolution of shaft 33. This back-and-forth pivoting of crank 45 raises and lowers push rod 42 with each revolution of shaft 33. And since push rod 42 is pivotally connected to mixing link 43, this produces a vertical two/rev. input to pitch link 36. Pivotal connection 47 may be a ball and recessed socket type to permit both pivotal and lateral movement of cylinder 48 relative to bell crank 45.

It should also be noted that reverse velocity airflow sectors on the retreating blade enlarge outwardly as $\mu$, the advance ratio ($V/\Omega R$) increases. Thus the angle of tilt of cylinder 52 must be gradually increased as $\mu$ increases beyond a given value.

Similarly rotor dynamic effects may require that the two/rev. input be phased into the one/rev. input at azimuth angles other than those shown in FIG. 5. This can be accomplished by changing the plane of tilt of cylinder 52 while maintaining the same displacement angle between the axes of cylinders 48 and 52. While only one two/rev. input link 55 is shown in FIG. 6, two such links connected 90° apart to cylinder 52 are preferable for controlling the plane of tilt of cylinder 52 in this manner.

Other forms of a two/rev. input assembly can also be used to produce the required two/rev. input to mixing link 53 shown in FIG. 6. For example, referring to FIG. 7 there is illustrated a flexible sheet 60 which is mounted to and turns with rotor 33 by means of drive sleeve 61. Mounted about shaft 33 but not rotating therewith is yoke 62 which carries two rollers 63A and 63B disposed 180° apart on the upper surface of sheet 60. Similarly mounted about shaft 33 is yoke 64 which carries rollers 65A and 65B that bear against the lower surface of sheet 60. Rollers 65A and B are disposed 180° apart, and 90° away from rollers 63A and B, but as indicated, on opposite sides of sheet 60. Yokes 62 and 64 are coaxially, rotatably and slidably mounted on shaft 33 by bearings 69A and 69B.

Yokes 62 and 64 are moved relative to each other and relative to shaft 33 by bell crank 66. Bell crank 66 connects to yoke 62 at pivot point 67 and to yoke 64 at pivot point 68, about which point the crank 66 fulcrums. The input to bell crank 66 is provided by the two/rev. input linkage 70. Lateral movement of link 70 causes yokes 62 and 64 to move with scissors like action relative to each other and coaxially relative to shaft 33 so as to raise or lower rollers 63A and B relative to rollers 65A and B, dependent on the direction of lateral movement of link 70. The relative movement of rollers 63A and B and rollers 65A and B deforms sheet 60. For example, the raising of rollers 65A and B relative to rollers 63A and B produces high spots in sheet 60 of equal magnitude 180° apart on sheet 60.

A pair of two/rev. push rods 71 engages the upper surface of sheet 60. The opposite ends of push rods 71 are connected to a pair of mixing links, 43' each of which corresponds to mixing link 43 of FIG. 6. The high spots produced by rollers 65A and B in sheet 60 cause push rods 71 to reciprocate up and down with each revolution of shaft 33. This reciprocation provides the two/rev. input to the mixing link 43' of FIG. 6. While only one such link is shown in FIG. 6, a second link is provided for connection between link 71 and the pitch horn 37 of the second blade which is omitted from FIG. 6.

Thus the scissors action of yoke 62 and 64 deforms sheet 60 to produce the reciprocal action of push rods 71 which feed a two/rev. cyclic input to mixing link 43'. The amplitude of the input is controlled by the amount of movement of input link 70. With regard to collective pitch control the entire two/rev. input assembly is connected through yoke 62 to the collective pitch input link 75, and thus adjusts vertically dependent on the value of collective pitch input. A conventional one/rev. cyclic pitch input may be introduced through linkage 76, which through crank 77 and link 78 combine with the collective pitch input 75 to position a conventional swash plate assembly of the type shown in FIG. 6 and thereby combine with the two/rev. input of the mixing link 43' to control blade pitch.

This flexible sheet arrangement can be adapted to provide three/rev. or four/rev. or higher orders of cyclic pitch inputs by increasing the number of roller positions on each side of the flexible sheet 60. Likewise the azimuth angle at which the pitch variation is introduced can be controlled by the azimuth position of these rollers relative to the flexible sheet. Likewise the amplitude of the two/rev. pitch variation can be controlled by selectively positioning these rollers vertically relative to each other and to the flexible sheet 60.

Referring to FIG. 8, still another two/rev. input assembly is illustrated. In this embodiment gear 80 is mounted on and rotates with shaft 33 so as to drive crank arm assembly generally designated 81 by means of an intermediate gear 82. Crank arm assembly 81 consists of an inner pivotal link 83, which pivotally connects to journal shaft 84, which in turn is pivotally connected to outer link 85 which is pivotally connected to two/rev. input link 86, which is journalled through slide 87. Slide 87 permits axial movement of link 86 but restrains such movement to the axis of slide 87.

Intermediate two/rev. push rod 88 is rotatably journalled at its lower end to shaft 84 and reciprocates up and down with each revolution of crank arm assembly 81. The amplitude of reciprocation of intermediate push rod 88 depends on the position of two/rev. input link 86 in slide 87. As link 86 is moved outwardly in slide 87, the amplitude of reciprocation of push rod 88 is reduced accordingly; vice versa, as link 86 is moved inwardly, the amplitude increases.

Intermediate push rod 88 is pivotally connected at its upper end to two/rev. input ring 90 which is tiltably mounted to the rotor mount (not shown) coaxially to shaft 33 by means of pivotal support brackets 91 and 92. Extending upwardly from the two/rev. input ring 90 are a pair of terminal push rods 93 which correspond to and function in essentially the same manner as previously described push rods 42 and 71 in the embodiments shown in FIGS. 6 and 7 respectively. As with the previous embodiments the entire assembly can be adjusted vertically relative to shaft 33 to permit collective pitch variation.

Still another embodiment for producing two/rev. or higher orders of cyclic pitch inputs is shown in FIG. 9. In this arrangement a three-dimensional cam assembly generally designated 100 is slidably journalled about shaft 33 by means of mounting 101. The non-rotating cylindrical cam 102 has an interior cam surface 103 which is fixed relative to shaft 33 by connection to the rotor housing (not shown) in a conventional manner. A cam follower roller 104 is mounted at one end of bell crank 105 which is fulcrummed about pivot point 106 to shaft 33. Bell crank 105 rotates with shaft 33. Extending upwardly from bell crank 105 is two/rev. terminal push rod 107 which engages a mixing link of the type described above to phase in a two/rev. input with a one/rev. cyclic input. Return spring 108 is provided to keep cam roller 104 in contact with cam surface 103.

An internal cam surface could be used as an alternative for spring 108.

The cylindrical cam 102 may be slidably mounted relative to shaft 33 to permit variation of the amplitude of the two/rev. input. As will be apparent from the drawing, upward movement of cylindrical cam 102 increases the amplitude of the two/rev. input because of the slanted surface of cam surface 103. Vice versa, downward movement of cylindrical cam 102 relative to shaft 33 decreases the amplitude of variation.

It will be apparent that cylindrical cams of this type can be employed to achieve different orders of pitch variation as required by the characteristics of the rotor. For example, a four lobed surface produces a two/rev. input, whereas a six lobed surface produces a three/rev. input. Also, azimuthal phasing of control may be achieved by rotation of cam 102 relative to shaft 33.

Referring now to FIGS. 10, 11, 12, 13, and 14, there is illustrated an embodiment of a Hooke's joint type two/rev. input mechanism which is functionally similar to one described above with reference to FIG. 6. In this arrangement slide member 110 is slidably mounted relative to shaft 111. Slide member 110 includes a spherical portion commonly referred to as a swash plate ball 112. Tiltably mounted on ball 112 is swash plate assembly generally designated 113.

Assembly 113 consists of two principal components, inner stationary race 114 which is connected to slide 110 in any conventional way (not shown) to keep inner race 114 stationary relative to shaft 111. The second principal element of swash plate assembly 113 is the outer rotating race 115 which is driven in a conventional way by drive sleeve 116 through drive scissors 117 (rotated for illustration in FIG. 10). Thus, swash plate assembly 113 has an inner stationary race 114 which pivots on ball 112 and an outer rotating race 115 which turns with rotor shaft 111. outer race 115 is rotatably mounted about inner race 114 by means of bearings 118.

Inner race 114 includes conventional means for providing a one/rev. cycle input and also a conventional means for introducing collective pitch. Neither means is shown; however both are constructed and operate in a manner well known in the art. Thus, the one/rev. cyclic pitch input causes inner race 114 to tilt relative to swash plate ball 112; whereas the collective pitch raises and lowers the entire swash plate assembly 113 on the swash plate slide 110 in order to effect collective pitch changes.

As thus far described this assembly employs conventional elements for controlling blade pitch in a manner which is well known in the art, i.e., tilting of the inner race 114 on ball 112 for cyclic pitch variation and raising and lowering the entire swash plate assembly 113 on slide member 110 for collective pitch control. Since these are conventional elements, no further description is deemed necessary.

Referring now to the design variations for adapting this assembly to the invention, a gimbal ring 120 is pivotally supported by outer race 115 by means of pivot connections 121A and B. Gimbal ring 120 supports tilt ring assembly generally designated 122 in pivot connection 123A and B. (Pivot connection 123B is hidden in FIG. 10; note FIG. 11 showing that it is positioned 180° away from pivot connection 123A).

Tilt ring assembly 122 consists of an outer rotating ring 124 which is rotatably mounted on an inner non-rotating ring 125 by means of bearings 126. Inner ring 125 is kept from rotating by means of link 127 which connects inner ring 125 to inner race 114 of swash plate assembly 113.

Thus, it will be apparent that if the tilt ring assembly 122 is tilted relative to the swash plate assembly 113, this will cause outer ring 124 of the tilt ring assembly 122 to rotate at an oscillatory speed in essentially the same way as described above with reference to the secondary cylinder 48 of FIG. 6.

Tilt ring assembly 122 is tilted relative to swash plate assembly 113 by means of a motor driven screw 130 which moves threaded actuator 131 so as to act through linkage 132 to raise or lower push rod 133 dependent on the direction of travel of actuator 131. Vertical movement of push rod 133 pivots tilt ring assembly 122 relative to swash plate assembly 112 and thus causes outer ring 124 to rotate in the above-described oscillatory manner.

There is a second identical motor driven screw drive means and associated linkage with a push rod 129 (FIG. 12) pivotally connected to the outer ring 124 which is positioned 90° away from the above-described screw drive means. Two such means are employed in order to define the tilt plane of ring 124.

Oscillation of outer ring 124 is translated to a two/rev. input to the blade pitch horn (not shown) in the following manner. Outer ring 124 is connected to scissors linkage 135 (shown rotated in FIG. 10 and frontally in FIG. 14 for purposes of illustration). Scissors 135 is connected by means of pivotal lug 136 to bell crank 137. Bell crank 137 is fulcrummed about pivot point 140 to the outer race 115. Connected to the other end of bell crank 127 is pitch link 141 which controls blade pitch through a conventional pitch horn (not shown).

Thus, bell crank 137 serves the function of the mixing link 43 of the previously described embodiments. Oscillatory rotation of outer ring 124 causes bell crank 137 to pivot back and forth relative to pivot point 140 with each revolution of shaft 111. This pivoting of bell crank 137 imparts a vertical two/rev. oscillation to pitch link 141.

While only one two/rev. input scissors 135, bell crank 137 and pitch link 141 assembly has been described, a second such assembly is provided in order to translate the oscillatory rotation of outer ring 124 to a second pitch link (FIG. 12) which is positioned 180° away from the first. Since these mechanisms are essentially identical to those which have been described above, further description is deemed unnecessary.

Under typical conditions a helicopter embodying this invention would hover and fly at slow speeds ($V = 100$ knots) essentially the same as a conventional helicopter, except for the use of auxiliary lifting devices such as the blade flaps. At about 100 knots the two/rev. cyclic pitch would be programmed into the rotor. For a higher speed without auxiliary propulsion, tilt-axis flight may occur up to the onset of stall and compressibility ($V = 250$ knots). With auxiliary propulsion main rotor rpm could be reduced, and auxiliary propulsion could extend the speed to a point limited primarily by the power available or to about 400 knots.

Programming of optimum transition points to achieve maximum speed and climb performance would depend on the particular vehicle's characteristics. It does appear, however, that the reverse-velocity condition must occur at a tip speed ratio greater than 0.5. The area of the rotor blades must be chosen so as to produce the required vehicle lift and control at the transition speed selected. It is also expected that the selection of transition speed would be such that near maximum climb performance is maintained.

Rotor control inputs by means of a one/rev. primary swash plate with a secondary two/rev. modifying input may be readily accomplished with the two/rev. used as a trim-type control. The amount of two/rev. input after transition may be either pilot or speed sensor adjusted as a function of the flight condition. The pilot transition control may be an on-off type system similar to a longitudinal trim device in an airplane. In hovering and slow-speed flight, this trimming would be unnecessary.

Rotor rpm control for the auxiliary propulsion operation may be accomplished by means of an overdrive device (two-speed type) similar to those used in automotive design. This would involve a planetary gear stage located between the engine and the main transmission reduction gears with an outer brake-controlled (stoppable) internal ring-gear to vary the rpm ratio. The control could be coupled to the two/rev input to be applied or removed simultaneously.

Another aspect of the invention is the provision of new airfoils which are especially adapted for reverse velocity lift generation. Since the blade must create positive lift regardless of whether relative wind is from the leading edge to the trailing edge of the blade or from the trailing edge to the leading edge, bi-symmetrical blades with rounded leading and trailing edges may be used. This is shown in the cross-sectional view of the blade 7 in FIG. 2. For example a 12 percent (chordal percentage) thick bi-symmetrical blade with 0.93 (chordal percentage) leading and trailing edge radii may be used. Similarly a 15 percent bi-symmetrical blade with 1.48 leading and trailing edge radii might be used. Likewise conventional NACA airfoil sections such as NACA 0012 and NACA $63_2$-015 can be used with leading edge radii of 1.58 and 1.594 respectively and trailing edges cut and radiused at about 90°C.

There are, of course, other variations and modifications to the above described embodiments which are and which will become apparent, but which do not depart from the inventive idea herein disclosed. It should therefore be understood that the embodiments described herein are but preferred embodiments and that variations and modifications to these embodiments are reserved which fall within the scope of the following claims.

I claim:

1. A rotor system for high speed helicopters comprising: a rotor with variable pitch rotor blades, drive means connected to said rotor for rotating said rotor and blades, first pitch control means operatively associated with said rotor for producing a one/rev. pitch control input, second pitch control means operatively associated with said rotor for producing a two/rev. pitch control input, means connecting said first and second pitch control means for mixing and imposing said one/rev. and two/rev. pitch control inputs on said rotor blades, said second pitch control means comprising a Hookes-type universal joint having gimbal means universally connecting one of the rotatable elements of said joint to said rotor and having the second rotatable element of said joint connected to said mixing means, and means for misaligning the axis of rotation of said universal joint elements relative to each other.

2. A rotor system according to claim 1 wherein said rotor has a rotor shaft and each rotatable element of said Hookes-type universal joint comprises a hollow cylinder located around said rotor shaft.

3. A rotor system according to claim 2 wherein one hollow cylinder of said Hookes-type universal joint is located within the other hollow cylinder of said Hookes-type universal joint.

4. A rotor system according to claim 1 wherein the rotor is a high solidity rotor having blades with rounded leading and trailing edges.

5. A rotor system according to claim 1, wherein a tail rotor is provided with means for rotating said tail rotor, and means twistably mounting said tail rotor to the helicopter, said mounting means comprising means for repositioning said tail rotor between a transverse countertorque orientation and a fore and aft forward propulsion orientation.

6. A rotor system according to claim 1, wherein the blades include auxiliary lift means for low forward airspeed operations, and means for selectively actuating said lift means, said lift means being adapted when actuated to increase positive lift of said blades at such low airspeeds, and when not actuated to eliminate said increased positive lift at high forward airspeeds.

7. A rotor system according to claim 6, wherein the auxiliary lift means comprise flap means movably mounted to said rotor blades, said flap means being movable between an operative position for increasing the positive lift generated by said rotor blades and an inoperative position eliminating the increased positive lift.

* * * * *